United States Patent [19]

Messier et al.

[11] 4,100,101

[45] Jul. 11, 1978

[54] EUROPIUM-ACTIVATED ALKALINE EARTH FLUOROHALIDE X-RAY PHOSPHORS AND METHOD FOR PREPARING THE SAME

[75] Inventors: Russell F. Messier, Ulster; Robert W. Wolfe, Wysox, both of Pa.

[73] Assignee: GTE Sylvania Incorporated, Stamford, Conn.

[21] Appl. No.: 698,058

[22] Filed: Jun. 21, 1976

Related U.S. Application Data

[63] Continuation-in-part of Ser. No. 614,836, Sep. 19, 1975, abandoned.

[51] Int. Cl.$^2$ .............................................. C09K 11/46
[52] U.S. Cl. .............................................. 252/301.4 H
[58] Field of Search ................................. 252/301.4 H

[56] References Cited

U.S. PATENT DOCUMENTS

| 3,951,848 | 4/1976 | Wolfe et al. | 252/301.4 H |
| 3,988,252 | 10/1976 | Ferretti | 252/301.4 H |

OTHER PUBLICATIONS

Tanaka et al., "Chem. Abstracts," vol. 80, 1974, 102216u.

*Primary Examiner*—Jack Cooper
*Attorney, Agent, or Firm*—John C. Fox

[57] ABSTRACT

In europium-activated alkaline earth fluorohalide x-ray phosphors, the brightness is improved by having a detectable amount of the europium activator in the trivalent state. This beneficial effect is achieved by using a non-reducing firing atmosphere during synthesis for a sufficient time to produce an amount of trivalent europium that is detectable by exciting a sample of the phosphor after firing with 254 nanometer excitation.

6 Claims, 3 Drawing Figures

EUROPIUM-ACTIVATED ALKALINE EARTH FLUOROHALIDE X-RAY PHOSPHORS AND METHOD FOR PREPARING THE SAME

CROSS-REFERENCES TO RELATED APPLICATIONS

This application is a continuation-in-part of our application Ser. No. 614,836, filed Sept. 19, 1975, and now abandoned.

In our U.S. Pat. No. 3,951,848 which issued on Apr. 20, 1976, and was filed on Apr. 28, 1975, we disclosed certain additives which increased the brightness of alkaline earth fluorohalides. The improvement in brightness occurs regardless of the activator state. In the parent application we disclosed that by having at least some of the europium in the trivalent state the brightness of emission when excited by x-ray is also improved. The brightness increased achieved by controlling the valence state of the activator occurs whether or not the additives of U.S. Pat. No. 3,951,848 are used. Thus it can be seen that the two inventions can be used together or separately.

BACKGROUND OF THE INVENTION

1. Field of the Invention

This invention relates to x-ray phosphors. More particularly it relates to europium-activated alkaline earth fluorohalide phosphors.

2. Prior Art

Europium-activated alkaline earth fluorohalide phosphors are known and are disclosed in the Netherlands Pat. No. 7,206,945 and in an article published by Sommerdijk, Verstegen, and Bril in J. Lumin. 8 pp 502–506, 1974. These references disclose materials of the formula MeFX wherein Me is strontium or barium and X is chlorine or bromine. These are disclosed to be activated by divalent europium.

In Canadian Pat. No. 842,704 a process is also disclosed for preparing europium-activated barium fluoride. In that patent the europium is reduced to the divalent form.

It is believed, therefore, that a europium-activated alkaline earth fluorochloride x-ray phosphor having an improved brightness would be an advancement in the art.

OBJECTS AND SUMMARY OF THE INVENTION

It is an object of this invention to provide an improved europium-activated alkaline earth fluorohalide x-ray phosphor.

It is a further object of this invention to provide a europium-activated alkaline earth fluorohalide x-ray phosphor activated by both trivalent and divalent europium.

It is another object of this invention to provide an improved alkaline earth fluorohalide x-ray phosphor by controlling the valence state of the europium activator.

It is still another object of this invention to provide an improved process for producing europium activated alkaline earth fluorohalide x-ray phosphors by the improvement that comprises heating the raw materials which contain a divalent europium source in a non-reducing atmosphere.

These and further objects are achieved in one aspect of this invention by a europium-activated x-ray phosphor of the formula:

$$Ba_{1-x}Sr_xF\,H{:}y\,Eu$$

wherein H is a halogen selected from Cl and Br, $x$ is from 0 to about 0.5 and $y$ is from about 0.001 to about 0.100 wherein the Eu is a mixture of $Eu^{+2}$ and $Eu^{+3}$; the $Eu^{+3}$ being present in at least an effective and detectable amount.

DETAILS OF THE PREFERRED EMBODIMENTS

For a better understanding of the present invention, together with other and further objects, advantages, and capabilities thereof, reference is made to the following disclosure, drawings, and appended claims in connection with the above-description of some of the aspects of the invention.

It is well established that $Eu^{+3}$ ions yield line emission in the red spectral region when excited by ultraviolet or cathode rays. $Eu^{+2}$ ions lead to band emission in the ultraviolet to blue region when excited by the ultraviolet light. It is believed to be unexpected that the presence of $Eu^{+3}$ ions in a crystalline host lattice would lead to ultraviolet to blue emission when excited by x-rays, particularly when there is no known mention of any use of $Eu^{+3}$ activators in alkaline-earth fluorohalide x-ray phosphors.

Since ultraviolet excitation is below the energy required for significant ionization processes to occur, the spectra emitted under UV excitation of an x-ray phosphor is a good measure of the $Eu^{+3}$ to $Eu^{+2}$ ion ratio. The magnitude of the 610 nm lines in the spectra produced under UV excitation is a good measure of the $Eu^{+3}$ level in a given x-ray phosphor activated by europium and has been found to correlate with the brightness of the blue emission produced under x-ray bombardment of the phosphor. Since the current x-ray film used is blue sensitive, the higher the blue emission the lower the exposure required to produce a satisfactory image.

The effects of the $Eu^{+2}$ and $Eu^{+3}$ ions in a $(Ba,Sr)FCl$ host containing 1 mole percent europium as an activator is illustrated by preparing compositions having a host represented by the formula $Ba_{0.95}Sr_{0.05}FCl{:}\,0.01\,Eu$ under essentially the same conditions except that a nitrogen (non-reducing) atmosphere is used for one material and an atmosphere containing 5% hydrogen and 95% nitrogen (reducing) is used for the other. Spectral energy distribution curves of the specified composition under the specified excitation media are illustrated in the figures.

Figure 1:
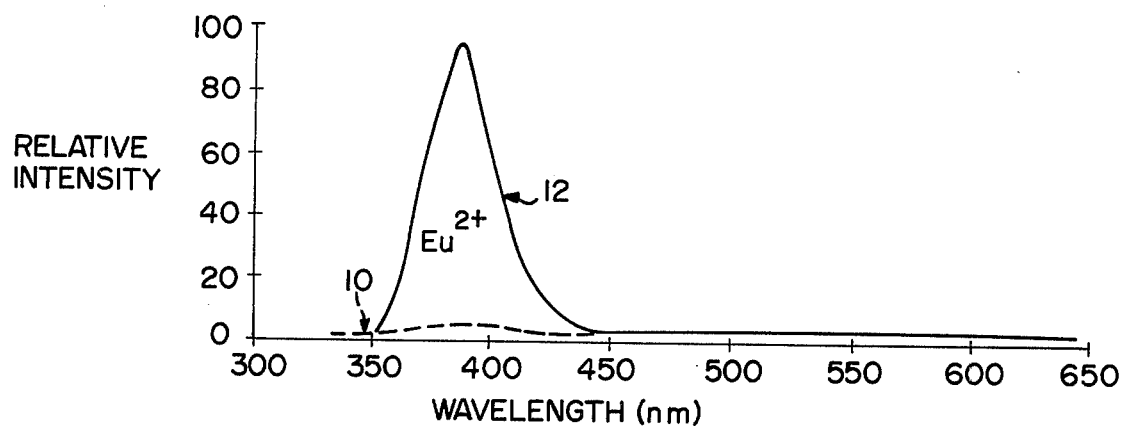
FIG. 1 shows the spectral energy curves under 245 nanometer excitation of europium-activated $Ba_{0.95}Sr_{0.05}FCl{:}Eu$ phosphor fired in reducing and non-reducing atmospheres.

With particular reference to FIG. 1, spectral energy curves of the emission of the two materials under 254 nanometer excitation is illustrated. Line 10 represents the emission of the material fired under the non-reducing atmosphere and line 12 represents the emission of the material fired under the reducing atmosphere. As can be seen the emission, under ultraviolet (254 nanometers) excitation, of the material prepared under the reducing atmosphere is much superior and more intense than the material prepared under non-reducing conditions.

Figure 2:
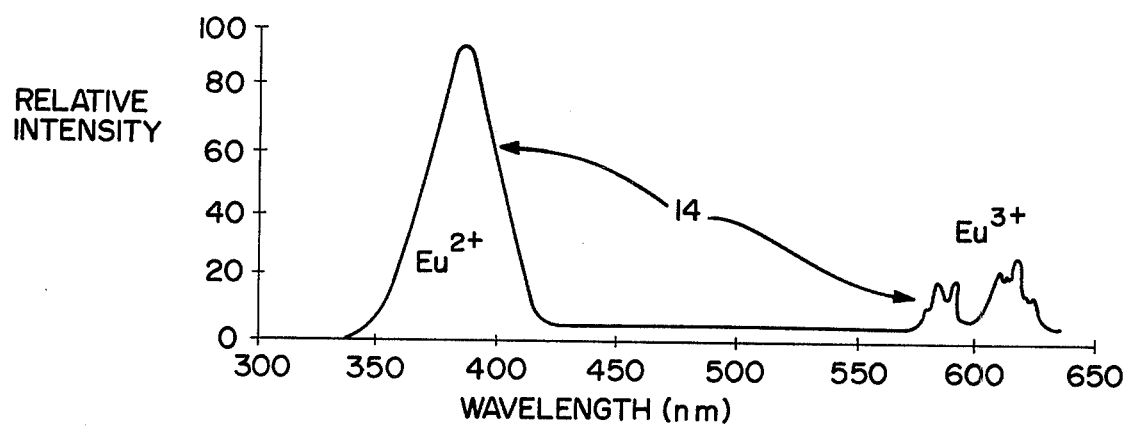
FIG. 2 shows the spectral energy curve under 245 nanometer excitation of a $Ba_{0.95}Sr_{0.05}FCl{:}Eu$ phosphor fired in a non-reducing atmosphere on an expanded scale.

With particular reference to FIG. 2 the spectral energy distribution of the material fired in the non-reducing atmosphere is illustrated in more detail by line 14 using a scale which reflects the total emission of the material. As can be seen, a small amount of emission does occur in the 575 to 625 nanometer (red) range which shows that small amounts of $Eu^{+3}$ are present. Thus even in inert or neutral atmospheres in the (Ba,Sr)FCl system there is an equilibrium between $Eu^{+2}$ and $Eu^{+3}$.

Figure 3:
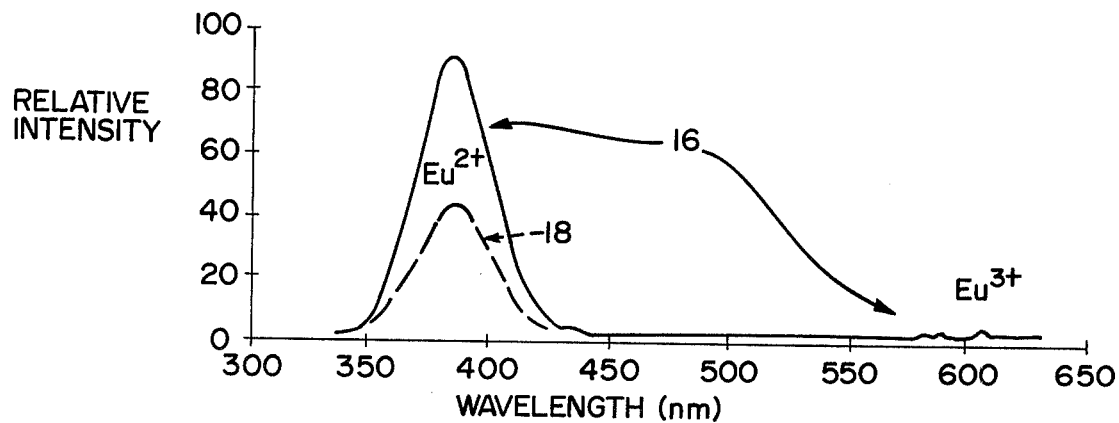
FIG. 3 show the spectral energy curve for the materials of FIG. 1 excited by x-rays.

With particular reference to FIG. 3, the spectral energy distribution of the two materials under 80 KV, 25 mA x-ray excitation is illustrated. The material fired in the nitrogen (non-reducing) atmosphere is shown as line 16 and line 18 represents the spectral energy distribution of the material prepared under reducing atmospheric conditions. As can be seen the material prepared in a neutral or a non-reducing atmosphere is more efficient under x-ray excitation than the material prepared in a reducing atmosphere while the reverse is true when the materials are subjected to 254 nanometer (ultraviolet) excitation.

Until about 2 to 3 years ago calcium tungstate was virtually the only phosphor used in x-ray intensifying screens. Since then some penetration of this phosphor market has been achieved by terbium-activated rare earth oxysulfide. Use of these brighter phosphors has shortened the time the patient is exposed to x-rays. The developements in the field has lead to research for new x-ray phosphors. As a result the role of activators in the x-ray phosphors was not completely understood. This was particularly true in the europium-activated alkaline earth fluorohalides, as disclosed by Sommerdijk, et al. in the J. Lumin article and in Netherlands Pat. No. 7,206,945. It is easily understood how investigators in the field would assume that a reducing atmosphere to thus produce $Eu^{+2}$ would be preferred because a 245 nanometer excitation media is one of the standards used in preliminary investigations of potential luminescent materials.

Prior to the present invention it is believed it was not known that there was a preferred valence state for the activator depending upon the excitation media used.

In preparing these alkaline earth fluorohalides of the present invention a non-reducing atmosphere is used. While a neutral atmosphere can be used, a slightly oxidizing atmosphere is preferred, such as by heating in an air-nitrogen mixture. As long as the temperature during preparation is held below about 850° C there will be no detrimental effects caused by conversion of the halides to oxides. While the firing time can be varied from about 1 hour to about 16 hours it is preferred to use from about 2 to about 6 hours. Temperatures of from about 550° C to about 750° C are preferred.

To more fully describe the present invention the following detailed example is presented. All parts, percentages, and proportions are by weight unless otherwise indicated.

Example I

About 166 parts of $BAF_2$, 197.6 parts of $BaCl_2$, 6.3 parts of $SrF_2$, 7.9 parts of $SrF_2$, 2.33 parts of $EuCl_2$, about 0.8 parts $Al(OH)_3$, and about 0.75 parts of KCl are mixed together to form a relatively uniform admixture.

The above admixture is divided into three parts and fired at 650° C for 4 hours with the atmospheres as shown below:

|  | Atmosphere |
|---|---|
| Sample 1 | Nitrogen |
| Sample 2 | 5% Hydrogen – 95% Nitrogen |
| Sample 3 | Air |

Samples 1 and 2 have spectral energy distributions as shown in FIGS. 1–3 under the types of excitation given in the detailed description of the drawing. Sample 3 is similar to Sample 1 except that the spectral energy distribution resulting from the presence of $Eu^{+2}$ is diminished and the spectral energy resulting from the $Eu^{+3}$ as demonstrated in FIG. 2 is increased. Integration of the area under the spectral energy distribution curve when the phosphors of the present invention are subjected to 254 namometer excitation, such as under Curve 14 in FIG. 2 afford a method to determine the relative proportions of $Eu^{+2}$ and $Eu^{+3}$. The area between about 300 and about 450 nanometers is attributed to $Eu^{+2}$ and the area between about 575 and 630 nanometers is attributed to $Eu^{+3}$. The respective areas have a direct relationship to the amount in the respective valence state. While an improvement is noted in the brightness when the area attributed to $Eu^{+3}$ is 1% of the area attributed to $Eu^{+2}$, it is preferred that the areas be within the ratio of $Eu^{+2}:Eu^{+3}$ of from 20:80 to 80:20. When air is used as the atmosphere about 95% of the $Eu^{+2}$ is oxidized to $Eu^{+3}$. A preferred method is to place the admixture in a furnace then use a nitrogen flow during the heating cycle thus the atmosphere can be described as slightly oxidizing. An optional method would be to use a mixture of any inert gas and air. Thus while any non-reducing atmosphere can be used and some of the benefits realized, a slightly oxidizing atmosphere is preferred.

The Example herein was directed to the production of a specific material which illustrates the best mode now contemplated, that is the brightest phosphor. This phosphor uses the aluminum additive as disclosed in our U.S. Pat. No. 3,951,848 and the potassium additive disclosed in co-pending U.S. patent application Ser. No. 619,620, filed on Oct. 6, 1975, which is assigned to the same assignee as the present invention. The present invention is not limited by the inclusion of the additives since the beneficial effects of $Eu^{+3}$ are observed in the absence of the Al or K additives.

While there has been shown and described what are at present considered the preferred embodiments of the invention, it will be obvious to those skilled in the art that various changes and modifications may be made therein without departing from the scope of the invention as defined by the appended claims.

What is claimed is:

1. A europium-activated x-ray phosphor composition of the formula:

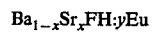

$$Ba_{1-x}Sr_xFH:yEu$$

wherein $x$ is from about 0 to about 0.5, $y$ is from about 0.001 to about 0.100 and H is a halogen selected from the chlorine and bromine, characterized in that europium is present in the trivalent state in an amount of at least 1 percent of the amount of europium in the divalent state.

2. A composition according to claim 1 wherein the ratio of $Eu^{+2}$ to $Eu^{+3}$ is from about 20:80 to about 80:20.

3. A composition according to claim 2 wherein H is chlorine.

4. A method for producing a europium-activated x-ray phosphor composition of the formula:

$$Ba_{1-x}Sr_xFH:yEu$$

wherein $x$ is from 0 to about 0.5, and $y$ is from about 0.001 to about 0.100, and H is a halogen selected from chlorine and bromine, the method comprising mixing alkaline earth metal halides and europium halides, and heating the mixture at a temperature within the range of from about 550° C to about 850° C to form the phosphor composition, characterized in that heating is carried out in a non-reducing atmosphere for a time sufficient to result in europium being present in the trivalent state in an amount of at least 1 percent of the amount of europium in the divalent state.

5. A process according to claim 4 wherein said atmosphere is a neutral atmosphere.

6. The method according to claim 4 wherein said atmosphere is nitrogen.

* * * * *

UNITED STATES PATENT AND TRADEMARK OFFICE
CERTIFICATE OF CORRECTION

PATENT NO. : 4,100,101
DATED : July 11, 1978
INVENTOR(S) : Russell F. Messier and Robert W. Wolfe It is certified that error appears in the above-identified patent and that said Letters Patent are hereby corrected as shown below:

| Column Number | Line Number | Per Patent | Per Specification |
|---|---|---|---|
| 2 | 10 | 245 | 254 |
| 2 | 15 | 245 | 254 |
| 3 | 43 | 245 | 254 |
| 3 | 67 | 2.33 | 2.23 |

Signed and Sealed this

Sixteenth Day of January 1979

[SEAL]

Attest:

RUTH C. MASON
Attesting Officer

DONALD W. BANNER
Commissioner of Patents and Trademarks